United States Patent [19]

Weir

[11] 4,048,910
[45] Sept. 20, 1977

[54] PLENUM COVER FOR ROOF MOUNTED VEHICLE AIR CONDITIONER

[76] Inventor: Robert Weir, 277 Bronx River Road, Yonkers, N.Y. 10704

[21] Appl. No.: 735,051

[22] Filed: Oct. 22, 1976

Related U.S. Application Data

[63] Continuation-in-part of Ser. No. 633,667, Nov. 20, 1975, abandoned.

[51] Int. Cl.$^2$ ............................................. B60H 1/28
[52] U.S. Cl. ..................... 98/2.16; 98/2.11; 98/40 D; 62/263; 62/DIG. 16
[58] Field of Search ........ 98/2, 40 D, 2.11, 2.14–2.16; 62/263, DIG. 16; 280/749

[56] References Cited

U.S. PATENT DOCUMENTS

| | | | |
|---|---|---|---|
| 2,109,071 | 2/1938 | Mautsch | 98/40 D |
| 3,315,488 | 4/1967 | Lind | 62/DIG. 16 |
| 3,319,558 | 5/1967 | Bodian | 98/40 D |
| 3,643,972 | 2/1972 | Caiati et al. | 280/749 |
| 3,776,123 | 12/1973 | Ehle et al. | 98/40 D |
| 3,880,060 | 4/1975 | Herb | 98/40 D |

Primary Examiner—John J. Camby
Assistant Examiner—Henry C. Yuem
Attorney, Agent, or Firm—Gerald Weir

[57] ABSTRACT

A plenum cover for a vehicle air conditioner of the roof-mounted type. The cover is essentially rectangular in shape having an opening at the top with elongated side walls and a base wall spaced below the top opening and being joined to the elongated side walls by opposed end walls. The base of the cover has a continuous elongated groove located substantially parallel with and spaced between the side walls. The groove in the base extends upwardly toward the top opening in the cover. The groove in the base is adapted to straddle the partition in an armored truck or taxi cab which separates the driver compartment from the cargo or passenger compartment. A plurality of diffusers located in either the base or side walls but on oppposite sides of the grooved portion of the base for diffusing cool air into the compartments located on opposite sides of the vehicle partition.

1 Claim, 3 Drawing Figures

PLENUM COVER FOR ROOF MOUNTED VEHICLE AIR CONDITIONER

This application is a continuation in part of my application Ser. No. 633,667 filed Nov. 20, 1975, now abandoned.

This invention relates to a plenum cover for a roof mounted vehicle air conditioner and more particularly to a plenum cover which is adapted to a straddle a vertical partition inside the vehicle which separates the driver area from the passenger or cargo area. The invention is particularly suited for use with or as a part of a roof mounted air conditioner for an armored truck or taxi cab.

BACKGROUND OF INVENTION

Roof mounted vehicular air conditioning apparatus currently in use are not compatible with partitioned vehicles such as taxis and armored trucks. In current use, either the front or rear portions of the vehicle passenger space are air conditioned but not both unless a second roof mounted air conditioning apparatus is used or unless more elaborate air conditioning equipment is installed.

An objective of this invention is to permit both front and rear compartments of a partitioned vehicle to be cooled by a single roof mounted air conditioning unit.

Other objects will be apparent from the following disclosure.

IN THE DRAWINGS

Figure 1:
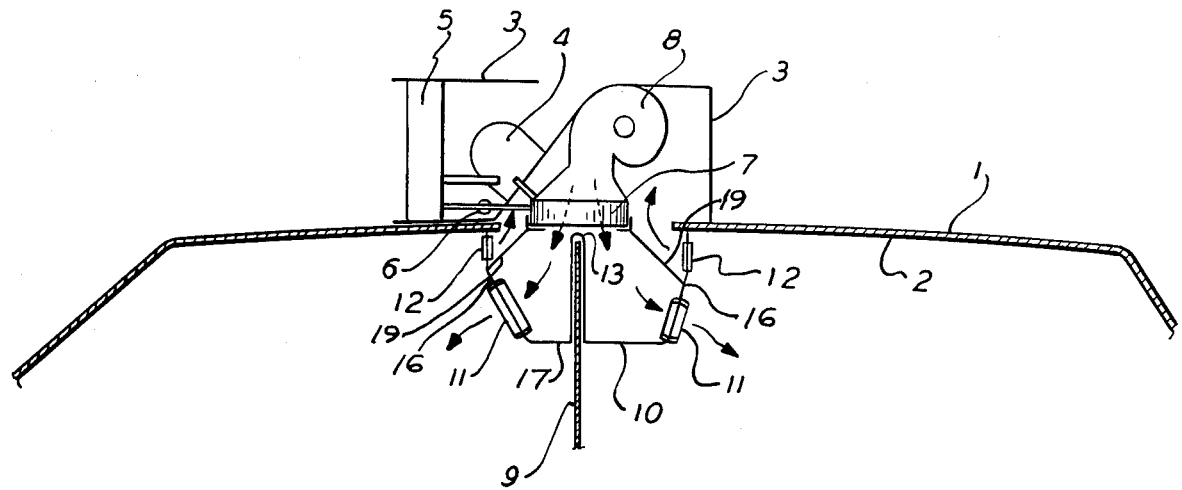
FIG. 1 shows a side view in cross-section of the plenum cover of the invention as it appears in use with a typical roof mounted air conditioning unit but installed in a partitioned vehicle.
Figure 2:
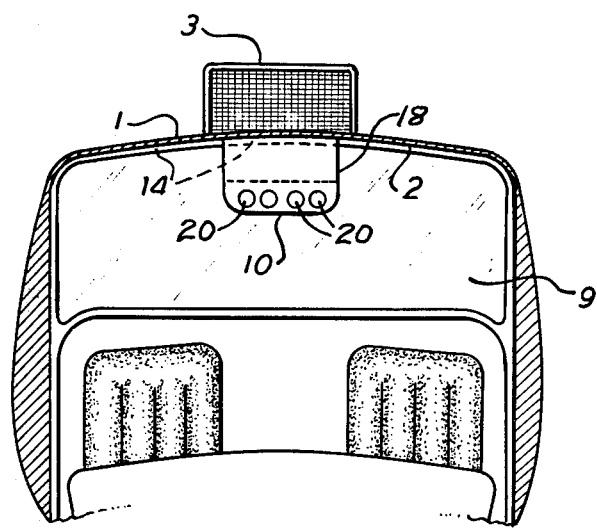
Fig. 2 shows a front view of the invention as same would appear in use in a partitioned vehicle.
Figure 3:
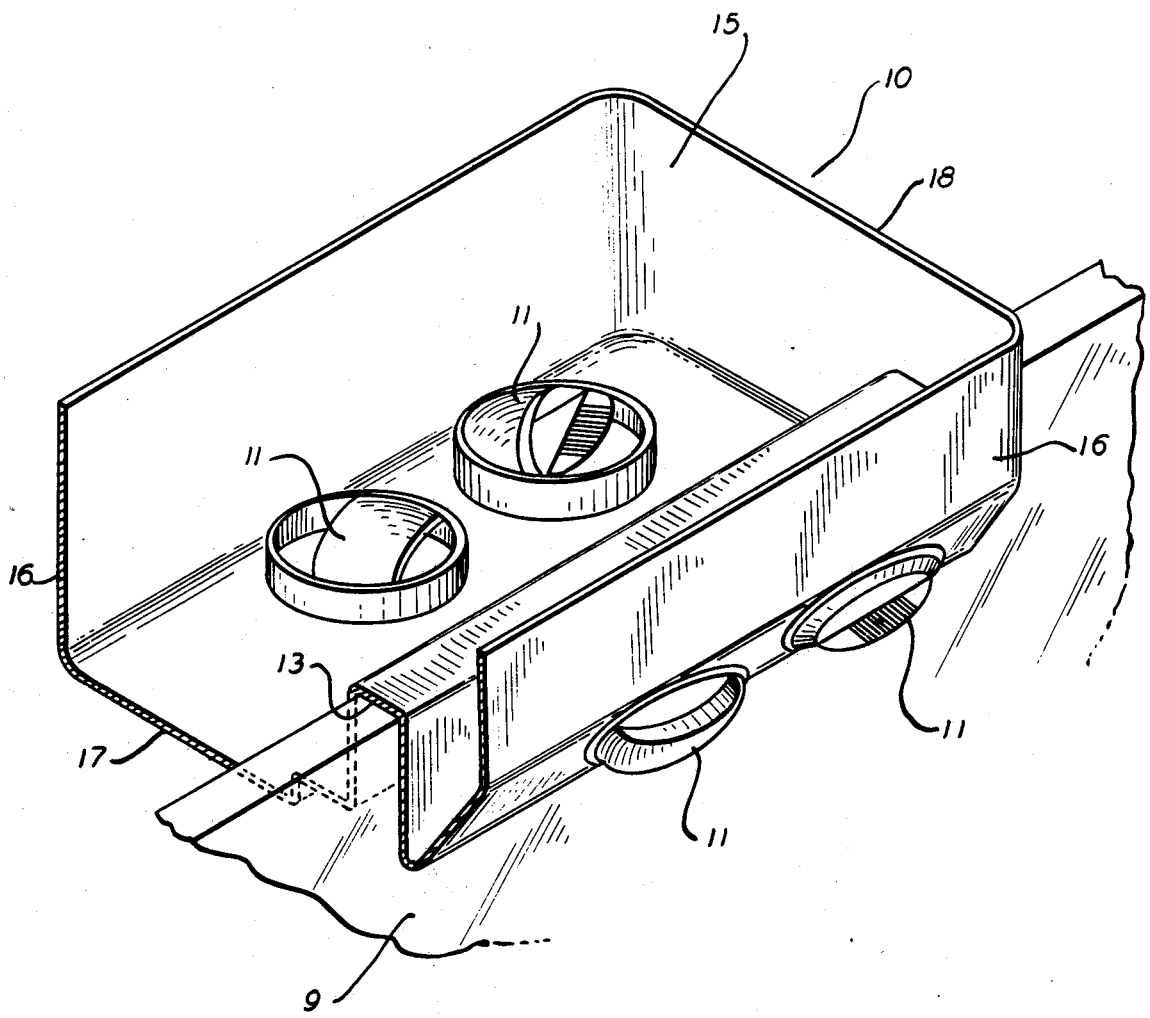
FIG. 3 is an isometric view partly in cross-section of the plenum cover of the invention.

Referring now to the drawings and particularly to FIGS. 1 and 3, the plenum cover of the invention 10 is shown attached to the ceiling 2 of a vehicle roof 1. The top opening 15 of the plenum cover 10 is located so as to receive cool air from the air conditioning unit 3 as shown by the downwardly facing arrows. The plenum cover 10 is formed with elongated side walls 16 and end walls 18 which are joined to a grooved base wall 17 so as to form a pair of hollow plenum chambers within the vehicle as will be further described hereinafter. The base wall 17 of plenum cover 10 is spaced below the top opening 15 and is formed with a continuous elongated groove 13 extending upwardly toward top opening 15. The groove 13 in base wall 17 is adapted to straddle a partition, such as is shown at 9, within a vehicle such as an armored truck or taxi cab. When installed in such a partitioned vehicle, the upwardly extending groove 13 in base wall 17 forms a pair of hollow plenum chambers, each being located on opposite sides of the vehicle partition. The groove 13, as shown, extends continuously across the base in a direction substantially parallel with, and spaced between side walls 16.

A plurality of flow directing diffusers 11 are located in the side walls 16 on opposite sides of base groove 13, to direct cool air into the compartments on opposite sides of vehicle partition 9. Alternatively, the diffusers could be located in the base wall 17 on opposite sides of base groove 13.

If desired, the plenum cover 10 could have return air openings 12 for recirculating air from the vehicle compartments upwardly through the air conditioning unit 3 and blower unit 8 to pass again over cooling heat exchanger 7 and into the plenum cover 10. In such case, the cover is formed with flow vanes 19 separating the cool air flow from the return air flow.

The plenum cover of the invention may be used with or actually form a part of a vehicle air conditioner of the roof mounted type. Such air conditioner may be of the completely self contained type as shown in FIG. 1 with compressor 4, condenser 5 and expansion valve 6 all being located within enclosure 3. Alternatively, the compressor, condenser and expansion valve may be located in the engine compartment of the vehicle and the refrigerant circulated through the cooling heat exchanger or evaportor 7 which is located on the vehicle roof. If desired, electrical control switches 20 may be located in one or both side walls.

What is claimed is:

1. A plenum cover for use with a vehicle air conditioner of the roof mounted type, said cover having an opening at its top and being formed by elongated side walls and a base joined to said side walls, said base being formed defining a continuous elongated groove extending upwardly toward said opening at the top and spaced between said side walls being adapted to receive a partition said vehicle, a plurality of air flow diffusers being located in said cover on opposite side of said elongated groove, said side walls having a plurality of openings for admitting return air into said cover, and a plurality of flow vanes positioned in said cover and being adapted to separate cool air flow being discharged through said diffusers from return air flow entering through said openings in said side walls.

* * * * *